Feb. 9, 1932.  F. W. GAY  1,843,921
POWER SYSTEM VOLTAGE REGULATOR
Filed Jan. 23, 1929  2 Sheets-Sheet 1

INVENTOR
FRAZER W. GAY
BY
George D Richards
ATTORNEY

Feb. 9, 1932. F. W. GAY 1,843,921

POWER SYSTEM VOLTAGE REGULATOR

Filed Jan. 23, 1929 2 Sheets-Sheet 2

INVENTOR.
FRAZER W. GAY
BY
George D. Richards
ATTORNEY

Patented Feb. 9, 1932

1,843,921

UNITED STATES PATENT OFFICE

FRAZER W. GAY, OF NEWARK, NEW JERSEY

POWER SYSTEM VOLTAGE REGULATOR

Application filed January 23, 1929. Serial No. 334,539.

This invention relates, generally, to voltage regulation, and the invention has reference, more particularly, to improvements in voltage regulation of alternating current power supply systems, and consists in providing a novel arrangement employing capacity elements for regulating and maintaining the voltage of such a power supply system at a stable value upon the occurrence of faults so located as to draw a large quantity of inductive reactive volt amperes.

When the alternating current system alone is depended upon for supplying the necessary reactive volt amperes to a fault, the system voltage is apt to be reduced below the stable point, resulting in synchronous machinery falling out of step, the derangement of the system operation and possible injury to apparatus. The employment of static condensers for furnishing the necessary reactive volt amperes in the event of a fault in an alternating current power system has heretofore been very limited due to the inherent characteristic of a static condenser to automatically reduce its inductive reactive volt ampere output at the very time when such output is most needed, i. e. upon a drop in system voltage. Also such a condenser automatically increases its inductive reactive volt ampere output at the very time when such output is a detriment to the system, i. e. upon an increase in system voltage.

Synchronous condensers have generally been used in place of static condensers for supplying inductive reactive volt amperes to a fault even though the losses of synchronous condensers are many times the losses of equivalent kva. static condensers and the costs of synchronous condensers, including larger and more expensive buildings, cranes, starting equipment, buses and switchboards, are as much or greater than the costs of equivalent static condensers.

Notwithstanding the much greater operating and maintenance costs of the synchronous condenser, and its occasional prolonged outage for repairs, the synchronous condenser nevertheless is preferred to the static condenser largely because of its inherent and automatic faculty of increasing its inductive volt ampere output furnished to the system upon the occurrence of a fault of such severity as to materially lower the system voltage. A normal synchronous condenser, if running at full load, may be relied upon to automatically increase its current output from one hundred percent to approximately one hundred and fifty percent upon a fifty percent reduction in system voltage from normal, and to reduce its current output to substantially zero upon a thirty percent increase in system voltage above normal. The current output of the static condenser on the other hand will decrease fifty percent upon a fifty percent reduction in system voltage from normal and will increase thirty percent upon a thirty percent increase in system voltage above normal. In other words the static condenser operates normally at a serious disadvantage and fails to materially aid the system in the event of a fault.

The inherent advantage of the synchronous machine is increased if a modern large high speed exciter and voltage regulator is employed in conjunction therewith, for in this case the synchronous machine may be forced to supply up to three times normal current upon a fifty percent reduction in voltage from normal and to reduce its current output to substantially zero upon a forty percent use in voltage above normal. An adjustment to the high current value can be accomplished in approximately two seconds after a fault occurs and the reduction of the current to zero value can be accomplished in less than three seconds after the fault clears.

It is the principal object of this invention to provide an arrangement whereby static condensers are satisfactorily employed for regulating system voltage, which condensers are adapted to have their impressed voltage increased upon a decrease in system voltage from normal as the result of a system fault and to also provide means for protecting such static condensers as well as the system from excessive instantaneous voltage rise upon the removal of a system fault.

It is well known that the best grades of solid insulation in present use and especially paper insulation, if of sufficient mechanical thickness and dielectric strength to resist a given high voltage continuously, can resist double this voltage for relatively long periods of time and even four or five times this voltage for brief intervals of time. It is of course to be expected that if such excess voltages are frequently applied, occasional failures will result, but provision has been made in static condensers or capacitors of the best design to safely and instantly cut out of service that particular section of the capacitor that fails, and the design is such that this small section can be easily and cheaply replaced when convenient. Such a failure does not in any way interfere with the continuous and proper functioning of the remaining good sections.

Other objects of this invention, not at this time more particularly enumerated, will be clearly understood from the following detailed description of the same.

The invention is clearly illustrated in the accompanying drawings, in which:—

Similar characters of reference are employed in all of the hereinabove described views, to indicate corresponding parts.

Figure 1:
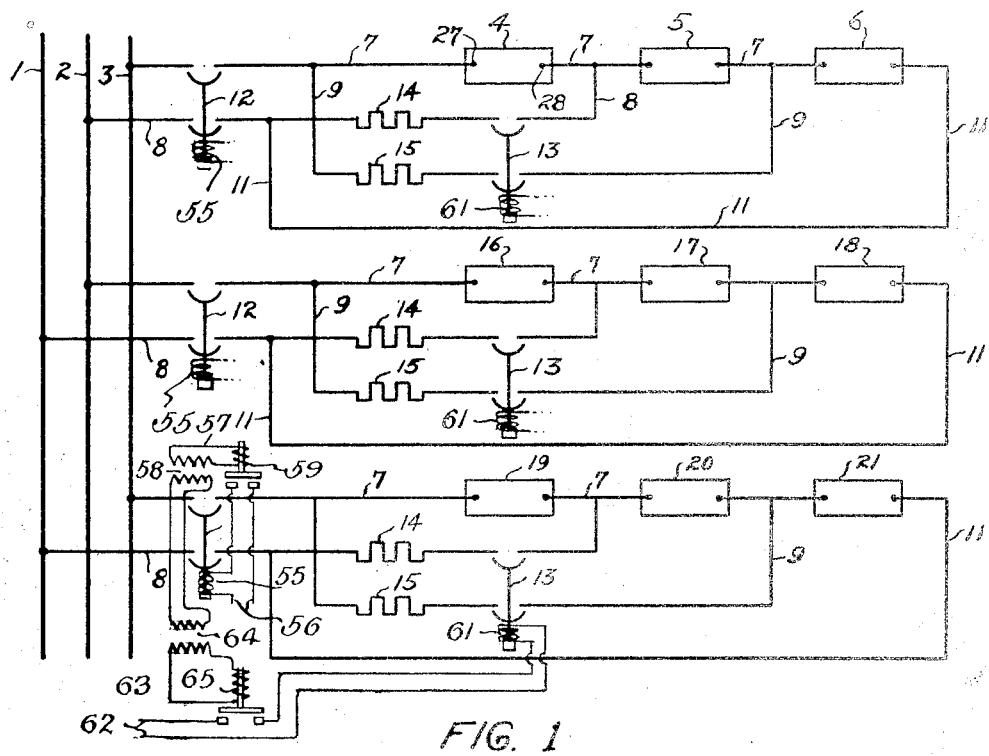
Fig. 1 is a wiring diagram of the novel arrangement of this invention illustrated as regulating the voltage in a three phase alternating current system.
Figure 2:
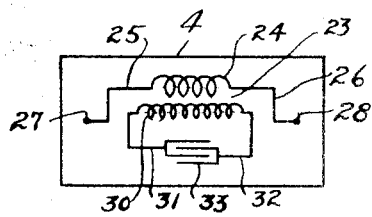
Fig. 2 is an enlarged schematic view of a capacitor device employed in the novel arrangement of Fig. 1.
Figure 3:
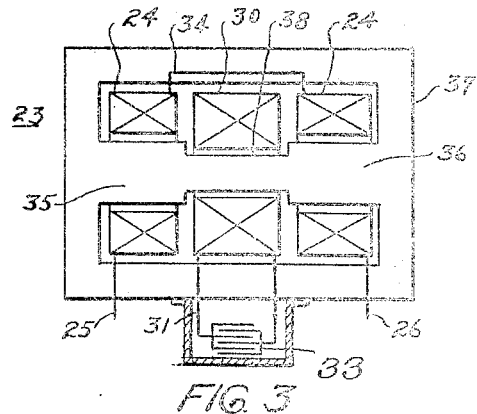
Fig. 3 is an enlarged view of a transformer and condenser employed in a capacitor device.

Referring now to Figs. 1 to 3 of the said drawings, 1, 2, 3 designates a three phase power line to which the novel voltage regulating arrangement of this invention is applied. This voltage regulating arrangement comprises similar capacitor devices 4, 5 and 6 connected in series by a lead 7 to the power line phase lead 3. Lead 7 is connected at a point between capacitor devices 4 and 5 to a lead 8, which is connected to the power line phase lead 2. Likewise lead 7 is connected at a point between capacitor devices 5 and 6 to a lead 9 which is connected to the lead 7 at a point adjacent capacitor device 4. Capacitor device 6 is connected by a lead 11 to lead 8.

A circuit breaker 12 is inserted between the phase leads 2 and 3 and the voltage regulating arrangement. A double pole contactor or switch 13 is positioned near capacitor device 5 and is adapted to open and close the circuits extending through leads 8 and 9. A resistance 14 is illustrated as included in the circuit of lead 8 and a resistance 15 is illustrated as connected in the circuit of lead 9. With circuit breaker 12 closed and double pole contactor 13 open, the capacitor devices 4, 5 and 6 are connected in series by leads 7, 11 and 8 and circuit breaker 12 across phase leads 2 and 3. With circuit breaker 12 and double pole contactor 13 both closed, capacitor devices 4, 5 and 6 are connected in parallel across phase leads 2 and 3. In this case, the connection for device 4 is from phase lead 3, by way of lead 7 through device 4 and lead 8 through resistance 14 to phase lead 2. The connection for device 5 is from phase lead 3, lead 7, by way of lead 9 through resistance 15 back to lead 7, through device 5 to lead 8, and by way of lead 8 through resistance 14 to lead 2. The connection for device 6 is from phase lead 3, lead 7, by way of lead 9 through resistance 15 back to lead 7, through device 6 to lead 11, and from lead 11 through lead 8 to phase lead 2.

Three capacitor devices 16, 17 and 18 are similar to capacitor devices 4, 5 and 6 and are adapted to be similarly connected to the power line phase leads 1 and 2. Likewise, capacitor devices 19, 20 and 21, also similar to devices 4, 5 and 6, are adapted to be similarly connected to the power line phase leads 1 and 3. Since the lead connections and associated apparatus of capacitor devices 16 to 21 are similar to that of devices 4, 5 and 6, like reference numerals are employed in connection with the leads and associated apparatus of all of these devices, thereby eliminating the necessity for further description of the hook up of devices 16 to 21.

Since the capacitor devices are all similar, only one of them, namely, capacitor device 4 will be described in detail. The capacitor device 4, as shown in Fig. 2, comprises a transformer 23 having the ends of its primary winding 24 connected by leads 25 and 26 to the terminals 27 and 28 of the capacitor device. The secondary winding 30 of transformer 23 has its ends connected by leads 31 and 32 to a condenser 33. The primary winding 24 of transformer 23 is divided into two sections as shown in Fig. 3 and these sections are connected by a lead 34. These sections of the primary winding encircle enlarged portions 35 and 36 of the transformer core 37. The secondary winding 30 encircles a reduced portion 38 of the core 37.

Circuit breakers 12 are adapted to be controlled by any suitable contact making voltmeters adjusted so that these circuit breakers normally close, for example, at one hundred percent line voltage and open at one hundred and three percent voltage. Likewise, double pole contactors 13 are controlled by suitable contact making voltmeters such that when the system line voltage drops to eighty percent of normal, these contactors are closed and when the line voltage rises to ninety percent of normal, these contactors open. The use of contact making voltmeters, such as a Westinghouse C. P. relay for controlling circuit breakers and contactors, are well known to those skilled in the art. In Fig. 1, the hook-up of these contact making voltmeters is illustrated, by way of example, in connection with the circuit breaker 12 and contactor 13 associated with capacitor devices 19, 20 and 21. In this figure this circuit breaker 12 has an operating coil 55 which is adapted to be supplied with energizing current from a supply line 56. A contact making voltmeter 57 has a transformer 58 with its primary connected across leads 7—8 and its secondary connected to energize the operating coil of a relay 59. Thus, this contact making voltmeter 57 may be adjusted so that when the voltage across leads 7—8 is normal, the relay 59 closes a circuit through operating coil 55, causing circuit breaker 12 to be closed, whereas, if the voltage across leads 7—8 rises to 103% voltage, relay 59 will open, thereby causing contactor 12 to open. Also, contactor 13 has an operating coil 61 adapted to be supplied with energizing current from a supply line 62. A contact making voltmeter 63 having a transformer 64 and a relay 65 is adapted to control the supply of energizing current to operating coil 61. The primary winding of transformer 64 is connected across phase leads 7—8 and the secondary winding of this transformer supplies energizing current to the operating coil of relay 65. Contact making voltmeter 63 may be adapted, for example, to close the circuit through operating coil 61 when the system line voltage drops to 80% normal, and when the line voltage rises to 90% voltage this circuit is again opened by the opening of relay 65. The circuit breakers 12 and contactors 13 associated with capacitor devices 4, 5 and 6 and 16, 17 and 18 are adapted to be operated in the same manner as the circuit breaker 12 and contactor 13 associated with capacitor devices 19, 20 and 21. In many locations a multiplicity of the novel voltage regulating arrangements of this invention will be installed in connection with a single three phase power line each of which installations will be equipped with circuit breakers 12. In such cases, the circuit breakers 12 of one installation will normally be adapted to operate at a voltage range slightly different from each of the others. Thus in one installation this circuit breaker may close at a hundred percent line voltage and open at one hundred and three percent line voltage, while in the next consecutive installation the circuit breaker may close at ninety nine and open at one hundred and two percent normal voltage.

Disturbances tending to seriously reduce the line voltage of the system are usually caused by short circuits and such short circuits usually clear up in from one to ten seconds. Such short circuits do not usually disturb the system stability unless they reduce the system voltage below eighty percent of normal, since at eighty percent the synchronizing power of the system is approximately two-thirds of normal; but at sixty percent of normal voltage the synchronizing power is not much better than one-third normal and in general at so low a synchronizing power the system stability will break down. It may be assumed that the critical stability range is from sixty to eighty percent voltage, the system stability being safe above eighty percent sustained voltage and lost below sixty percent sustained voltage.

In operation, with normal line voltage impressed on the power supply system leads 1, 2 and 3, i. e. during normal operation of the device, circuit breakers 12 are closed and double pole contactors 13 are open. Under these conditions, the capacitor devices 4 to 6, 16 to 18 and 19 to 21 are connected by leads 7, 11 and 8 in series across their respective phase leads 2—3, 1—2, and 1—3, causing each of these devices to absorb one third of the line voltage. Transformers 23 are so designed that with one-third normal line voltage thus impressed across their primary terminals, the portions 35 and 36 of the core 23 are one-third saturated and reduced portion 38 is one-half saturated.

If now, as the result, for example, of the occurrence of a line fault, the line voltage should drop to say two-thirds its normal value, the contactors 13 will close thereby connecting the capacitor devices 4 to 6, 16 to 18 and 19 to 21 in parallel across their respective phase leads. Since each of the transformers 23 now has two thirds normal line voltage impressed across its terminals, the portions 35 and 36 of the core 23 will be two-thirds saturated and reduced portion 38 is fully saturated. At this impressed voltage the capacitor devices deliver their maximum capacity effect. Since the impressed voltage on each transformer 23 is now twice that obtained when the system is operating at normal voltage, the capacity current of each capacitor device is twice that at normal voltage and as each set of three capacitor devices are in multiple, the total capacity current will be six times normal, thereby serving to raise the system voltage above seventy percent which will be sufficient to carry the system through the critical period. A line breaker will operate to rupture the short circuit and the system voltage will then tend to rise rapidly to a high value. This rise is produced by the well known action of automatic regulators, which act to raise generator excitation to excessive values and being incapable of reducing this value quickly. The regulators are given approximately one-fourth of a second to recover before the device of this invention returns to normal operation. The capacitor devices are saturated, however, and the magnetizing current in primary windings 24 will increase and cancel some of the capacity current produced by the condensers so that an excessive momentary rise in line voltage is prevented. For further increase in line voltage the cores 35 and 36 of the transformers will saturate and the transformer coils 24 will act as loading coils to hold down line voltage.

Figure 4:
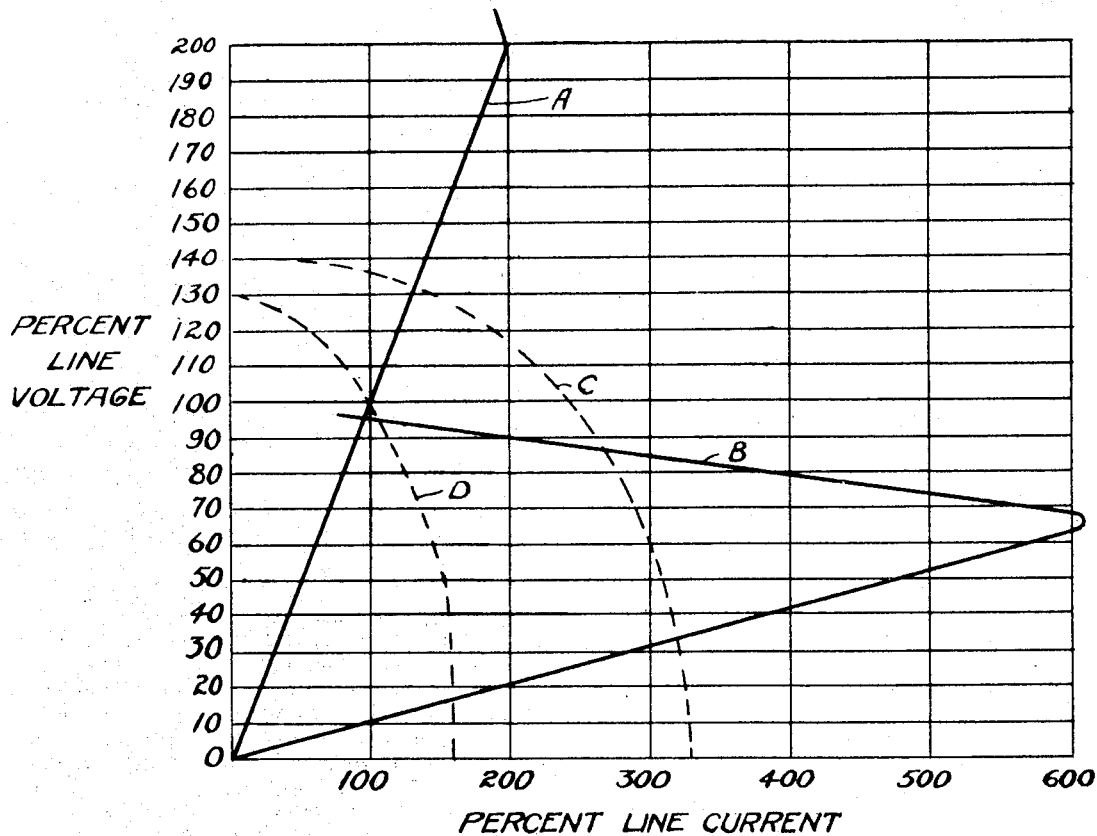
Fig. 4 is a graph illustrating the operation of the novel arrangement of this invention.

In the graph of Fig. 4, the percent of system line voltage is plotted as ordinates and the percent of line current taken by the arrangement of this invention is plotted as abscissa. Curve A shows the current taken by the arrangement during normal operation of the system with the capacitors in series across each pair of phase leads. Curve B shows the current voltage curve for the arrangement of this invention when the capacitor devices are connected in parallel, i. e. when contactors 13 and circuit breakers 12 are closed. Curve D shows the external characteristic of a synchronous condenser operating under normal full load field and curve C shows the external characteristic of the same synchronous condenser operating under maximum field which is several times normal.

Resistances 14 and 15 act to limit the current in the capacitor devices in the event a sustained short circuit is suddenly removed causing the line voltage to rise above normal and the saturation of core portions 35. These resistances may be omitted if desired in which event the saturation of the transformers 23 alone will be depended upon to retain the current within a reasonable value.

It will be noted that the arrangement of this invention acts automatically to prevent an excessive rise in voltage when a short circuit is suddenly removed from the system after the generators have built up their field in an effort to maintain voltage. The condensers 33 are protected against dangerous voltages by the saturation of the transformer core portion 38. The saturation of core sections 35 and 36 serves to cause primary windings 24 to act as reactors for limiting voltage rises in excess of normal.

Owing to the inherent characteristics of the device of this invention its capacity effect can be obtained or eliminated in an extremely short time which is substantially from one-third to one-fourth the period now considered standard for such operation.

Also there is no tendency of the capacitor devices to fall out of step and thereby contribute to the system distress as is possible with synchronous condensers. Often, under severe system disturbances when the synchronous condensers fall out of step they cause a failure of system stability which would not have occurred if the condensers had remained in step. This tendency to fall out of step is enormously increased by over excitation and at very high field strengths these machines will fall out under relatively slight disturbances.

Figure 5:
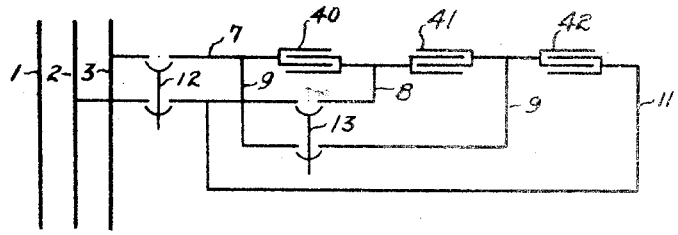
Fig. 5 is a wiring diagram of a modified arrangement of the invention.

It will be obvious to one skilled in the art that many different modifications of this invention may be used and it is desired, therefore, not to limit the invention to the particular structure shown. For example, it is possible to omit the transformers 23 and to employ condensers alone. This is illustrated in Fig. 5 wherein condensers 40, 41 and 42 during normal operation are connected in series across phase leads 2—3, and the closure of contactor 13 acts to place them in multiple upon a system voltage disturbance. In this arrangement however, the system is not protected against the flow of large instantaneous capacity currents upon a sudden rise in system voltage until after either switch 12 or contactor 13 operates. Furthermore, the over-voltage suffered by the condensers may be so great as to seriously damage them.

Figure 6:
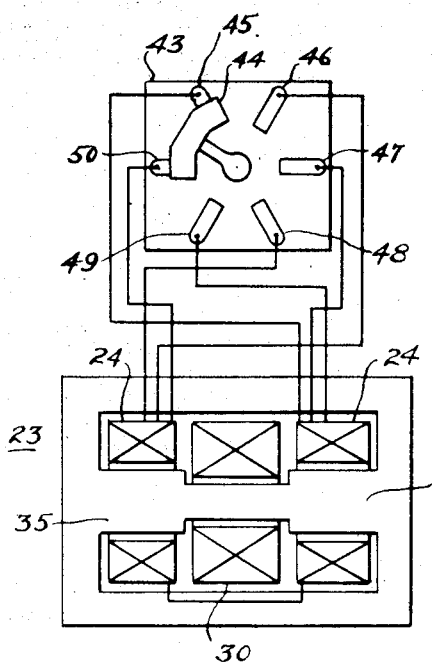
Fig. 6 illustrates a modified method of controlling a transformer employed in the invention.

It is evident furthermore, that it is not essential to use the contactor 13 in the preferred form of the invention. Thus, each transformer may be provided with a tap changing device 43 having a movable bridge 44 and contacts 45 to 50, as illustrated in Fig. 6. All of the transformers 23 may normally operate in multiple across the power line phase leads and any desired ratio between primary windings 24 and secondary windings 30 obtained by operating this tap changer. Tap changer 43 may be operated by hand. It is obvious that the novel arrangement of this invention is also applicable to a single phase system as well as to any system having a plurality of phases.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In combination, an electric power distribution system and an arrangement for regulating the voltage of said distribution system, said arrangement comprising, condensers adapted to be electrically connected to said system, and transformer means interposed between said condensers and said system for impressing voltage on said condensers, and means adapted to function to effect an increase in the induced voltage impressed by said transformer means upon said condensers on the occurrence of a drop in system voltage, said transformer means being adapted to saturate and the inductive reactive current absorbed thereby serving to counteract the capacity reactive current of the arrangement should a sudden rise in system voltage above a predetermined value occur during the functioning of said means.

2. In combination, an electric power distribution system and a device for taking capacity current from said system, said device comprising, a plurality of capacitors, transformer means arranged to connect said capacitors to said system, turn ratio changing means for increasing or decreasing the transformer turn ratio existing between said system and said connected capacitors, said transformer means having cores so proportioned that, for the maximum magnetic flux setting of said turn ratio changing means, increments of system voltage increasing above and decreasing below a desired critical value will cause the capacity current taken by said device to decrease.

3. In combination, an electric power distribution system and an arrangement for regulating the voltage of said distribution system, said arrangement comprising, a plurality of capacitors adapted to be electrically connected to said system, and transformer means interposed between said capacitors and said system for impressing voltage on said capacitors, and switch means acting on closing to connect each of said transformer means and its connected capacitor in parallel with the remaining transformer means and their capacitors, said switch acting on opening to place said transformer means and their connected capacitors in series relation, said transformer means having cores so proportioned that during the parallel connection of said transformer means and capacitors, any variation in system voltage above or below a predetermined critical value will cause the capacity current taken by said arrangement to decrease.

In testimony, that I claim the invention set forth above I have hereunto set my hand this 21st day of January, 1929.

FRAZER W. GAY.